United States Patent
Lee et al.

(10) Patent No.: US 11,830,669 B2
(45) Date of Patent: Nov. 28, 2023

(54) CASTING COIL FOR A MOTOR ASSEMBLY

(71) Applicants: HYUNDAI MOTOR COMPANY, Seoul (KR); KIA CORPORATION, Seoul (KR)

(72) Inventors: Jiyong Lee, Seoul (KR); Cheol-Ung Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/483,547

(22) Filed: Sep. 23, 2021

(65) Prior Publication Data

US 2023/0026729 A1 Jan. 26, 2023

(30) Foreign Application Priority Data

Jul. 16, 2021 (KR) .................. 10-2021-0093550

(51) Int. Cl.
*H01F 41/06* (2016.01)
*H02K 3/12* (2006.01)
*H02K 1/2786* (2022.01)
*H02K 3/28* (2006.01)

(52) U.S. Cl.
CPC ........... *H01F 41/06* (2013.01); *H02K 1/2786* (2013.01); *H02K 3/12* (2013.01); *H02K 3/28* (2013.01); *H02K 2213/03* (2013.01)

(58) Field of Classification Search
CPC .... H01F 41/06; H02K 1/2786; H02K 15/066; H02K 21/16
See application file for complete search history.

(56) References Cited

U.S. PATENT DOCUMENTS

| | | | |
|---|---|---|---|
| 5,998,903 A | 12/1999 | Umeda et al. | |
| 6,198,190 B1 | 3/2001 | Umeda et al. | |
| 10,992,198 B2 | 4/2021 | Yoshikawa et al. | |
| 11,070,103 B2 | 7/2021 | Kato et al. | |
| 2020/0006993 A1 | 1/2020 | Yoshikawa et al. | |
| 2020/0044503 A1 | 2/2020 | Yoshikawa et al. | |
| 2020/0099279 A1* | 3/2020 | Lee | H01F 41/061 |
| 2020/0212770 A1 | 7/2020 | Yoshikawa et al. | |
| 2020/0235628 A1 | 7/2020 | Kato et al. | |

(Continued)

FOREIGN PATENT DOCUMENTS

| | | | | |
|---|---|---|---|---|
| EP | 2688183 A2 * | 1/2014 | ........... | H02K 15/045 |
| EP | 2688183 A2 | 1/2014 | | |
| KR | 101849636 B1 | 5/2018 | | |

(Continued)

*Primary Examiner* — Minh N Trinh
(74) *Attorney, Agent, or Firm* — LEMPIA SUMMERFIELD KATZ LLC

(57) ABSTRACT

A casting coil for a motor assembly, which is formed in a multi-layer structure, includes: a first coil formed to extend in one direction; a second coil bent to extend from an end of the first coil; a third coil bent to extend from an end of the second coil in a direction parallel to the first coil; and a fourth coil bent to extend from an end of the third coil in a direction parallel to the second coil. The first coil, the second coil, the third coil, and the fourth coil form one layer so that a hollow multi-layer structure is formed. A larger magnetic field can be formed by securing a slot filling factor of 50% or more of a stator in the same motor package.

4 Claims, 11 Drawing Sheets

(56) References Cited

U.S. PATENT DOCUMENTS

2023/0026729 A1* 1/2023 Lee ..................... H02K 1/2786

FOREIGN PATENT DOCUMENTS

| WO | 9854822 A1 | 12/1998 |
| WO | 2018135094 A1 | 7/2018 |
| WO | 2018154943 A1 | 8/2018 |
| WO | 2018155221 A1 | 8/2018 |

* cited by examiner

CASTING COIL FOR A MOTOR ASSEMBLY

CROSS-REFERENCE(S) TO RELATED APPLICATIONS

This application claims priority to Korean Patent Application No. 10-2021-0093550, filed on Jul. 16, 2021, which is incorporated herein by reference in its entirety.

BACKGROUND

Field of Present Disclosure

The present disclosure relates to a motor assembly, a coil mounted on the motor assembly, and a method of manufacturing the same.

Description of Related Art

A technology that has recently become the biggest topic in the automobile industry is an eco-friendly vehicle technology including hybrid vehicles and electric vehicles. In the meantime, the main technology development field for vehicles has been the development of fuel efficiency improvement technology for internal combustion engines.

However, as the eco-friendly vehicle technology has recently emerged, the technology for motors, which serve as the heart of eco-friendly vehicles, is also getting attention. In the motor, as a great deal of current flows through the package in the same space and thus an electromagnetic force is increased, a torque can be increased, and efficiency can be increased. Conventional industrial motors do not have many limitations in space, but vehicles have space limitations because motors, batteries, and controllers should be disposed in a limited space. In other words, it is essential to develop a high-output motor technology to fit in the same space.

Motors usually applied to vehicles are three-phase induction motors. Each motor is divided into a rotor for forming a magnetic field using a permanent magnet or an electromagnet and a stator for flowing a current to a coil and applying a magnetic field to the rotor. Thus, an output of the motor may be obtained.

As shown in FIG. 1, in a conventional stator 10, a circular coil 1 or a quadrangular coil 2 are mounted on slots 11 protruding from an inner circumferential surface of the stator 10 to be disposed on a concentric circle at equal intervals. Electricity is applied to the coils 1 or 2 to drive a motor. As a magnetic field is formed to be greater by flowing a greater current, a greater torque can be obtained. In plain language, the more the coil is wound, the greater output the motor can achieve. Winding of a lot of coils in the same space is referred to as a slot filling factor and it is better that the slot filling factor becomes greater.

FIG. 2 is a diagram illustrating a cross-sectional shape of a portion of a motor assembly. In general, a slot filling factor of the circular coil 1 may range from 25% to 45%. A slot filling factor of the quadrangular coil 2 may range from about 40% to 50%.

In the drawing, a rotor 20 is disposed inside the stator 10 and a permanent magnet 21 is disposed on an outer circumference of the rotor 20.

The slot filling factor is as follows.

$$\text{Slot filling factor} = \frac{\text{coil area}}{\text{slot area}} \times 100$$

The contents described in the above Description of Related Art are to aid understanding of the background of the present disclosure and may include what is not previously known to those having ordinary skill in the art to which the present disclosure pertains.

SUMMARY

Embodiment of the present disclosure are directed to a casting coil for a motor assembly, which is capable of forming a larger magnetic field by securing a slot filling factor of 50% or more of a stator in the same motor package, to a method of manufacturing the same, and to a motor assembly.

Other objects and advantages of the present disclosure can be understood by the following description and become apparent with reference to the embodiments of the present disclosure. Also, it should be apparent to those having ordinary skill in the art to which the present disclosure pertains that the objects and advantages of the present disclosure can be realized by the means as claimed and combinations thereof.

In accordance with an embodiment of the present disclosure, a casting coil for a motor assembly includes: a first coil formed to extend in one direction; a second coil bent to extend from an end of the first coil; a third coil bent to extend from an end of the second coil in a direction parallel to the first coil; and a fourth coil bent to extend from an end of the third coil in a direction parallel to the second coil. The first coil, the second coil, the third coil, and the fourth coil form one layer so that a multi-layer structure in which an end of the fourth coil is connected to a first coil of a next layer is formed.

Here, a width of each of the first coil, the second coil, the third coil, and the fourth coil may be greater than a thickness of each thereof.

In addition, a bent angle of each of the second coil, the third coil, and the fourth coil may be 90 degrees.

In addition, the first coil of the next layer may be in surface contact with the first coil to be stacked on the first coil. The second coil of the next layer may be in surface contact with the second coil to be stacked on the second coil. The third coil of the next layer may be in surface contact with the third coil to be stacked on the third coil. The fourth coil of the next layer may be in surface contact with the fourth coil to be stacked on the fourth coil so that the multi-layer structure may be formed.

Meanwhile, the casting coil may be integrally formed of an aluminum (Al) material in the multi-layer structure by casting.

Further, a width of each of the first coil, the second coil, the third coil, and the fourth coil may be divided into a plurality of pieces or parts.

Next, in accordance with another embodiment of the present disclosure, a motor assembly includes: a stator including a plurality of slots formed to protrude from an inner circumferential surface of the stator and disposed at equal intervals on a concentric circle; a rotor disposed inside the stator and having a permanent magnet disposed on an outer circumferential surface of the rotor; and a plurality of casting coils press-fitted into the plurality of slots. An inner surface of the casting coil is in surface contact with an outer surface of the slot.

In addition, a slot filling factor (%), which is an area ratio of the casting coil to an area of the slot, may be 70% or more.

In addition, the casting coil may be integrally formed of an Al material by casting.

Further, the casting coil may include a first coil formed to extend in one direction; a second coil bent to extend from an end of the first coil; a third coil bent to extend from an end of the second coil in a direction parallel to the first coil; and a fourth coil bent to extend from an end of the third coil in a direction parallel to the second coil. The first coil, the second coil, the third coil, and the fourth coil form one layer so that a multi-layer structure in which an end of the fourth coil is connected to a first coil of a next layer is formed, and a width of each of the first coil, the second coil, the third coil, and the fourth coil may be greater than a thickness of each thereof.

Next, in accordance with still another embodiment of the present disclosure, a method of manufacturing a casting coil for a motor assembly includes casting the casting coil, performing coating treatment on the cast casting coil, and pressing the casting coil.

In addition, the method may further include dividing a width of the pressed casting coil.

Further, in the casting of the casting coil, the casting coil may be cast of an Al material.

DESCRIPTION OF SPECIFIC EMBODIMENTS

In order to fully understand the present disclosure, operational advantages of the present disclosure, and objects attained by practicing the present disclosure, reference is made to the accompanying drawings that illustrate embodiments of the present disclosure and to the description in the accompanying drawings.

In describing embodiments of the present disclosure, known technologies or repeated descriptions have been reduced or omitted to avoid unnecessarily obscuring the gist of the present disclosure. When a component, device, element, or the like of the present disclosure is described as having a purpose or performing an operation, function, or the like, the component, device, or element should be considered herein as being "configured to" meet that purpose or to perform that operation or function.

Figure 1:
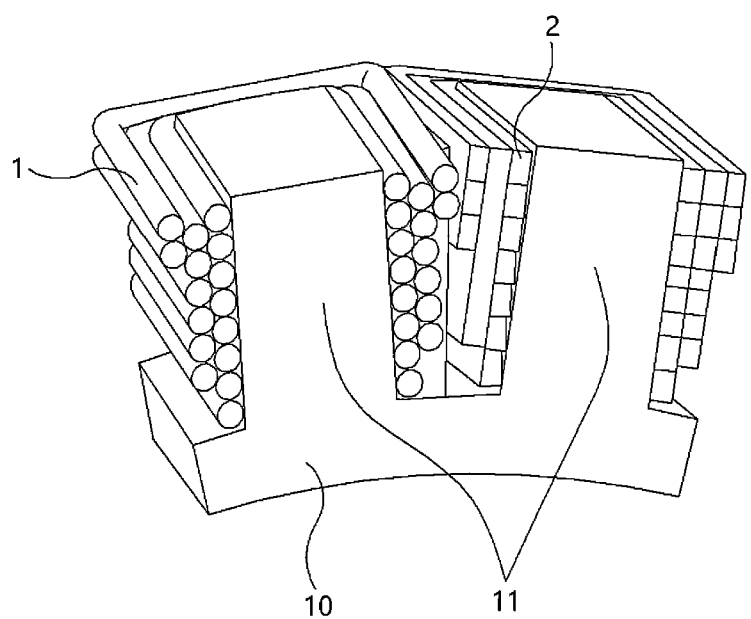
FIG. 1 is a diagram illustrating an example of a conventional coil for a motor.
Figure 2:
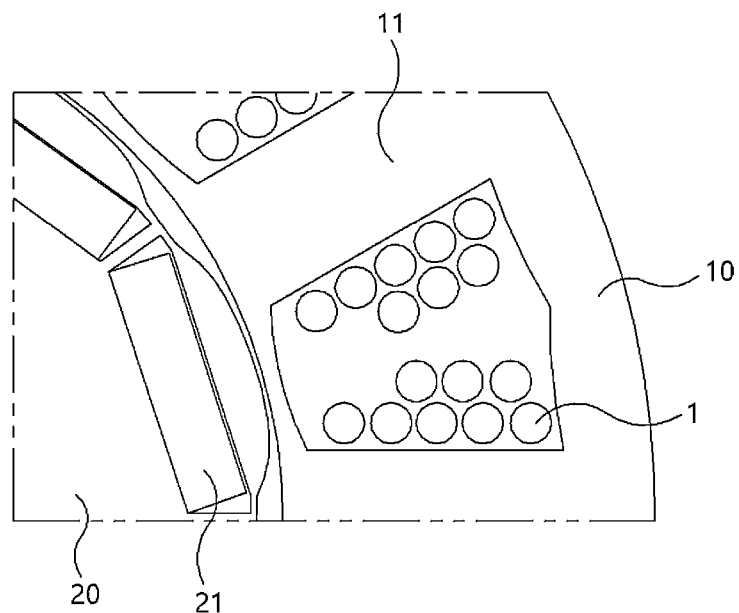
FIG. 2 is a diagram illustrating a partial cross-sectional shape of a motor showing a slot filling factor by the conventional coil.
Figure 3:
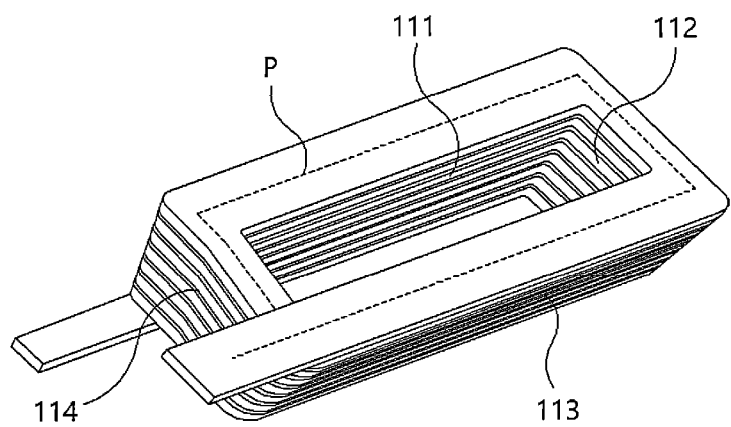
FIG. 3 is a diagram illustrating a casting coil according to one embodiment of the present disclosure.
Figure 4:
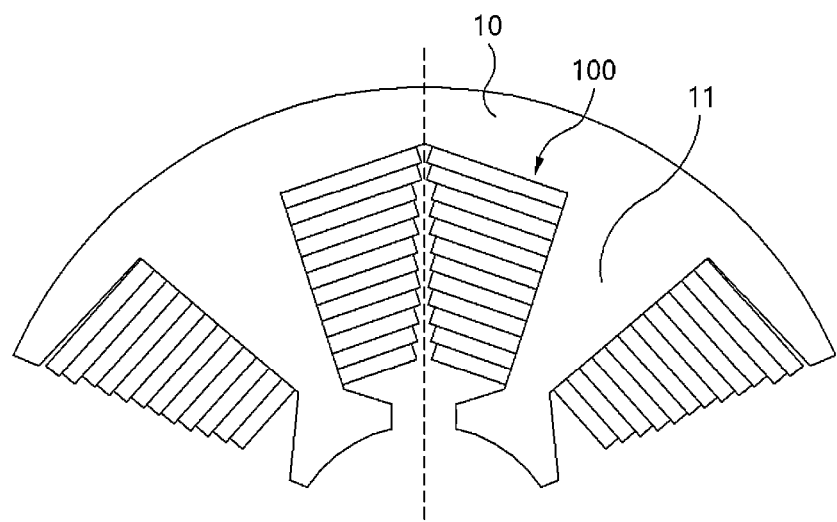
FIG. 4 is a diagram illustrating a partial cross-sectional shape of a motor on which the casting coil is mounted according to one embodiment of the present disclosure.
Figure 6:
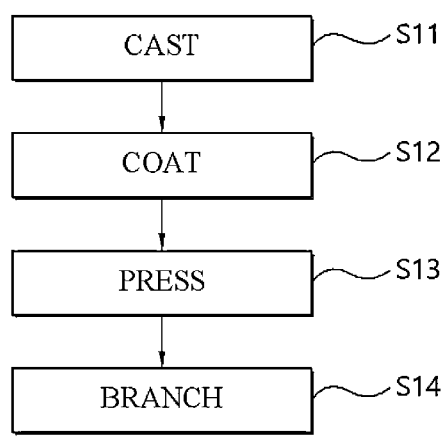
FIG. 6 is a diagram illustrating a method of manufacturing a casting coil according to one embodiment of the present disclosure.

FIG. 3 is a diagram illustrating a casting coil according to one embodiment of the present disclosure. FIG. 4 is a diagram illustrating a partial cross-sectional shape of a motor on which the casting coil is mounted according to one embodiment of the present disclosure. In addition, FIG. 6 is a diagram illustrating a method of manufacturing a motor according to one embodiment of the present disclosure.

Hereinafter, a casting coil for a motor assembly, a motor assembly thereof, and a manufacturing method thereof according to one embodiment of the present disclosure are described with reference to FIGS. 3, 4, and 6.

A conventional general motor is formed by winding a circular coil made of a copper (Cu) material in a slot. In this case, a slot filling factor ranges from about 25% to 45%.

Therefore, due to a circular coil shape, a void between the coils becomes large. As the number of turns of the coil (the number of windings) is increased, interference between the coils mounted on adjacent slots occurs.

In order to compensate for the above interference, a high-performance motor employs a Cu coil having a quadrangular cross-sectional shape to increase a slot filling factor to the range of 40% to 50% so that when compared with a circular-section coil, the slot filling factor is increased.

However, in this case, as the number of turns of the coil is increased, the interference between the coils mounted on adjacent slots also occurs.

In other words, according to the related art, a void is generated according to a shape of the coil, and thus it is impossible to increase the slot filling factor. As the number of turns of the coil is increased when the coil is wound on the slot, a section, which cannot be used due to the interference between adjacent slots, occurs.

According to the present disclosure, in order to solve the above problem to improve the slot filling factor and performance of the motor, a casting coil 100 manufactured by casting is applied so that there is no need to wind the coil on a slot 11 of the stator 10.

Therefore, it is possible to use all spaces inside the slot 11 to maximize the slot filling factor. Since the casting coil 100 may be inserted into the slot 11 without a winding process, it is possible to reduce a process cost by eliminating the winding process.

According to the casting coil of the present disclosure, it is possible to secure the slot filling factor of 70% or more. When a minimum interval between the slots is considered, it is possible to secure the slot filling factor of about 78%, and pure Al may be applied in addition to Cu and the casting coil may be manufactured by a method such as gravity casting, low-pressure casting, high-pressure casting, or precision casting.

As described above, when compared with the conventional winding coil, the Al casting coil may increase the slot filling factor to suppress an increase in resistance. Thus, a weight of the coil and a production cost may be reduced.

To this end, the casting coil 100 according to one embodiment of the present disclosure is not a coil made of a Cu material and wound on the slot 11 like the conventional coil. Instead, the casting coil 100 has a form of being inserted into the slot 11 to cover a predetermined range of an outer circumferential surface of the slot 11. Thus, an inner surface of the casting coil 100 is in surface contact with the outer circumferential surface of the slot 11 to have a form extending from one end to the other end.

In other words, by casting a material such as Al, the casting coil 100 may be manufactured to have a form of being wound as a coil as shown in FIG. 3 and may be formed to extend from one end to the other end so that a current may flow along the casting coil 100 to generate a magnetic field.

The casting coil 100 is formed such that a first coil 111, a second coil 112, a third coil 113, and a fourth coil 114 form one layer and are sequentially connected. When the one layer is referred to as a first layer, the casting coil 100 is formed in a multi-layer structure in which the fourth coil 114 is connected to a first coil 111 of a second layer.

The first coil 111 has a flat plate shape extending in one direction, the second coil 112 has a flat plate shape bent or oriented to extend from an end of the first coil 111, and the third coil 113 has a flat plate shape bent or oriented to extend from an end of the second coil 112 in a direction parallel to the first coil 111.

In addition, the fourth coil 114 has a flat plate shape bent or oriented to extend from an end of the third coil 113 in a direction parallel to the second coil 112. The first coil 111, the second coil 112, the third coil 113, and the fourth coil 114 each may be bent or oriented at an angle of 90 degrees to correspond to the slot 11.

The fourth coil 114 is connected to a first coil 111 of a next layer (an upper layer) again, thereby forming a sequentially connected multi-layer structure. Thus, the fourth coil 114 is formed to be inclined upward by as much as a height of the next layer and is connected to the first coil 111.

In addition, as shown in the drawing, any coil portion of a lowermost layer and any coil portion of an uppermost layer may be drawn out and connected to a power source.

Here, in an embodiment, in the multi-layer structure, a gap between each layer may be minimized Thus, as the manufacturing method is described below, each layer becomes in a state of being spaced apart from each other after the casting, but the casting coil 100 being cast is pressed so that it is manufactured that there is no gap between the layers. In other words, the form in which the first coils 111 are stacked on each other, the second coils 112 are stacked on each other, the third coils 113 are stacked on each other, and the fourth coils 114 are stacked on each other is obtained.

Thus, as shown in the drawing, the inclined fourth coil 114 may be bent on a vertical plane at a connection point with the first coil 111 and a connection point with the third coil 113 due to pressing to form a bending line.

Meanwhile, in another embodiment, an outer side of each of the first coil 111, the second coil 112, the third coil 113, and the fourth coil 114 of the next layer is respectively formed to be smaller than an outer side of each of the first coil 111, the second coil 112, the third coil 113, and the fourth coil 114 of the one layer.

In other words, all the outer sides of the casting coil 100 are formed in a tapered shape to gradually become smaller so that the casting coil 100 may be efficiently disposed on a concentric circle without interference between adjacent casting coils 100.

By forming as described above, the casting coil 100 forms a hollow. The hollow formed in the casting coil 100 is formed to have a size corresponding to an outer diameter of the slot 11.

In addition, since the hollow is formed to have the size corresponding to the outer diameter of the slot 11, when inserted into the slot 11, the inner surface of the casting coil 100, i.e., inner surfaces of the first coil 111, the second coil 112, the third coil 113, and the fourth coil 114, may be in surface contact with an outer surface of the slot 11, thereby minimizing a void.

In addition, as shown in the drawing, each of the first coil 111, the second coil 112, the third coil 113, and the fourth coil 114 is formed such that a width is greater than a thickness. This becomes a shape that cannot be formed by a circular coil or a quadrangular cross-sectional coil and is made possible by a casting coil manufactured by casting of the present disclosure.

In other words, as shown in FIG. 4, in consideration of the interval between the slots 11, it is possible to manufacture the casting coil 100 at a maximum width not interfering with adjacent casting coils 100 in the motor assembly. When the casting coil 100 is installed in the slot 11, the slot filling factor may be significantly increased.

Next, a casting coil according to another embodiment of the present disclosure is described with reference to FIG. 5. Descriptions of components and functions that are the same as those of the above-described embodiment have been omitted herein.

Figure 5:
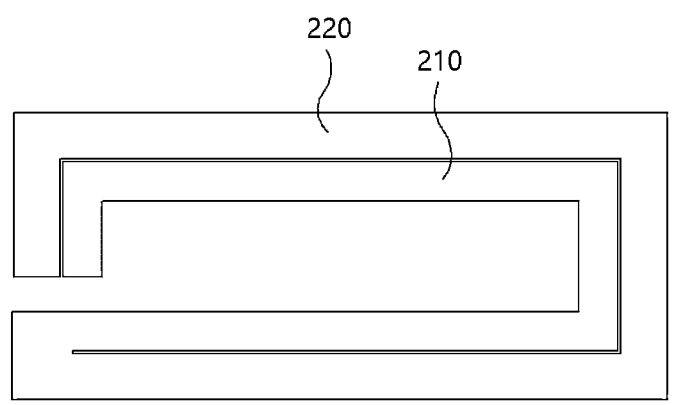
FIG. 5 is a diagram illustrating a casting coil according to another embodiment of the present disclosure.

The casting coil according to the embodiment of FIG. 5 is a casting coil, which branches into an inner coil 210 and an outer coil 220 so that a current flows in both the inner coil 210 and the outer coil 220.

The inner coil 210 is a coil disposed on an inner side based on a hollow, and the outer coil 220 is a coil disposed on an outer side of the inner coil 210. As in the above-described embodiment, each of the inner coil 210 and the outer coil 220 is formed such that a first coil, a second coil, a third coil, and a fourth coil form one layer and are sequentially connected. When the one layer is referred to as a first layer, each of the inner coil 210 and the outer coil 220 is formed in a multi-layer structure in which the fourth coil is connected to a first coil of a second layer again.

The casting coil of the present embodiment is an example to further increase the number of windings (the number of turns) of a coil. After being cast in the same manner as in the above embodiment, when being cut or cast by pressing in the form of dividing a width direction of each coil portion, the casting coil may be manufactured by giving a phase difference between the inner coil 210 and the outer coil 220.

The division may be implemented by cutting along a cutting line P of FIG. 3. Thus, an integrated casting coil having a double number of turns is formed and the portion drawn out from the uppermost layer of FIG. 5 is combined and connected again.

As described above, when branching, the number of turns may be doubled, and when divided into a plurality of pieces, the number of turns is further increased.

Since power of the motor may be expressed by Equation 1 below, and a main factor of a numerator may be expressed by the number of turns and an area, when the casting coil branches, A may be maintained and N may be increased.

$$L = \frac{\mu N^2 A}{l} \quad \text{[Equation 1]}$$

where:
L=Inductance in henries (H)
μ=permeability (WblA*m)
N=number of terms in coil
A=area encircled by coil (m$^2$)
l=length of coil (m)

Figure 7:
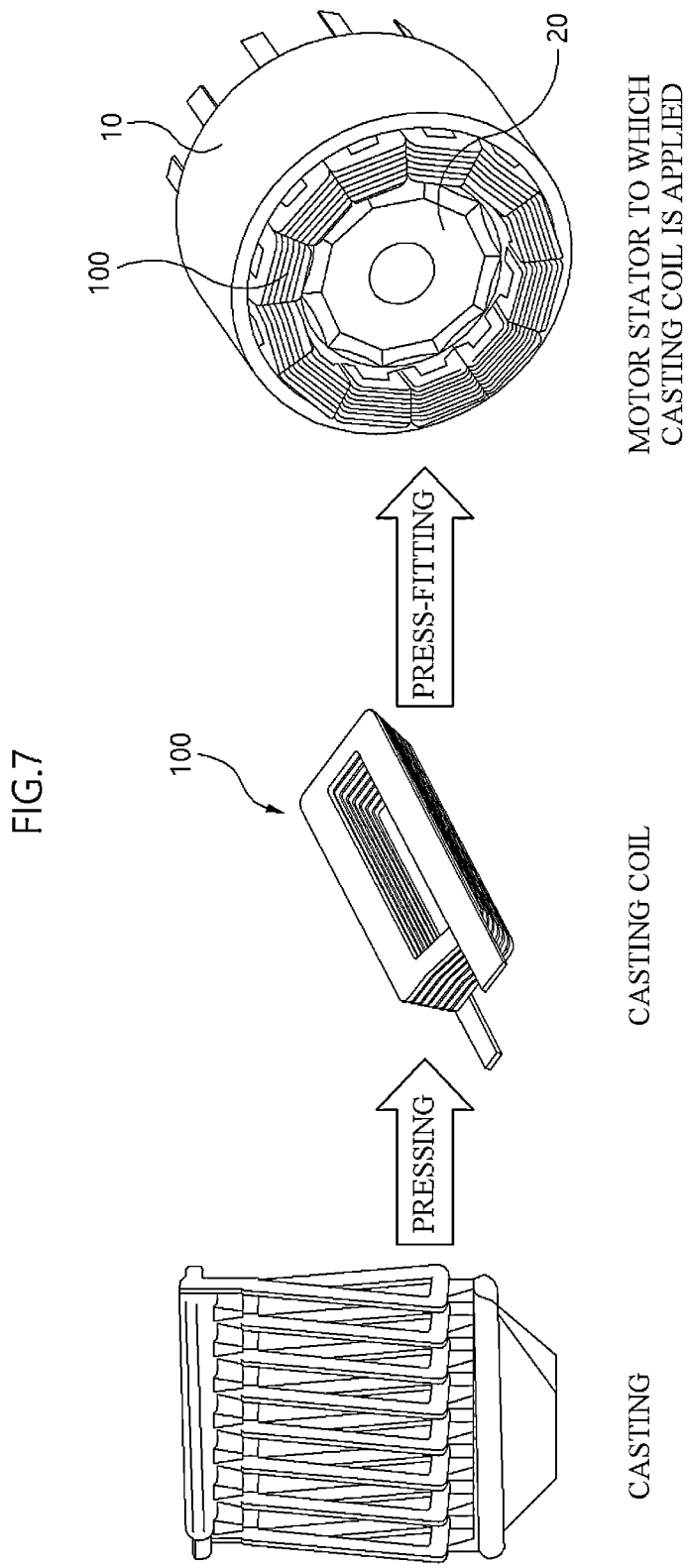
FIG. 7 is a diagram illustrating a method of manufacturing a motor according to one embodiment of the present disclosure.

FIG. 6 is a diagram illustrating a method of manufacturing a casting coil according to one embodiment of the present disclosure. FIG. 7 is a diagram a method of manufacturing a motor including the casting coil.

In the casting coil according to one embodiment of the present disclosure, the casting coil 100 is cast first from an aluminum material in the form described in the previous embodiment by a casting device (S11).

Coating treatment is performed on the cast casting coil 100 (S12) and the casting coil 100 is vertically pressed by a press device (S13). In other words, during the casting before the pressing step, each layer of the casting coil 100 is cast to be spaced apart from each other by a predetermined interval. The casting coil 100 is pressed so that each layer is in surface contact therewith to be stacked.

Then, a width of the pressed casting coil 100 is divided and thus the pressed casting coil 100 branches, as necessary (S14).

As described above, when the casting coil 100 is manufactured to be fitted in the slot 110, the slot 110 of the stator 10 is assembled by being press-fitted and inserted into the hollow.

An example of the casting coil 100 of the present disclosure, which is manufactured as described above, is summarized by comparing with the Cu coil according to the conventional method.

TABLE 1

|  | Cross-sectional area (128.7 mm$^2$) | Slot filling factor | Coil weight (per one slot) | Total coil weight (twelve slots) | Production cost |
| --- | --- | --- | --- | --- | --- |
| Cu coil (58 ms/s) | 27.7 mm$^2$ | 43.0% | 29.5 g | 354 g | 100% |
| Al casting coil (34 ms/m) | 39.4 mm$^2$ | 61.2% | 14.3 g | 171.6 g | 13% |
| Al/Cu | 42% | 42% | 51.5% | 51.5% | 86.7% |

As summarized above, it can be seen that the slot filling factor of the casting coil of the present disclosure was increased by 42%, the weight of the casting coil thereof was reduced by 515%, and a production cost of the casting coil thereof was reduced by 86.7% based on the same number of turns as the existing circular coil.

Figure 8:
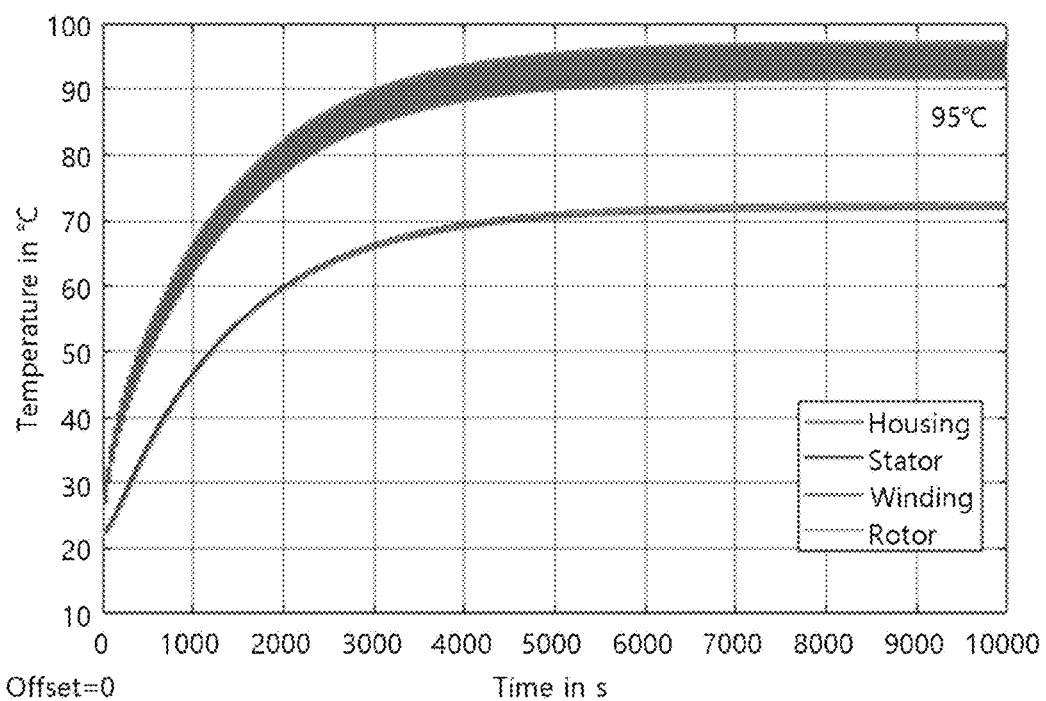
FIG. 8 is a graph showing an analysis result of thermal behavior when a copper (Cu) coil is applied according to the related art.
Figure 9:
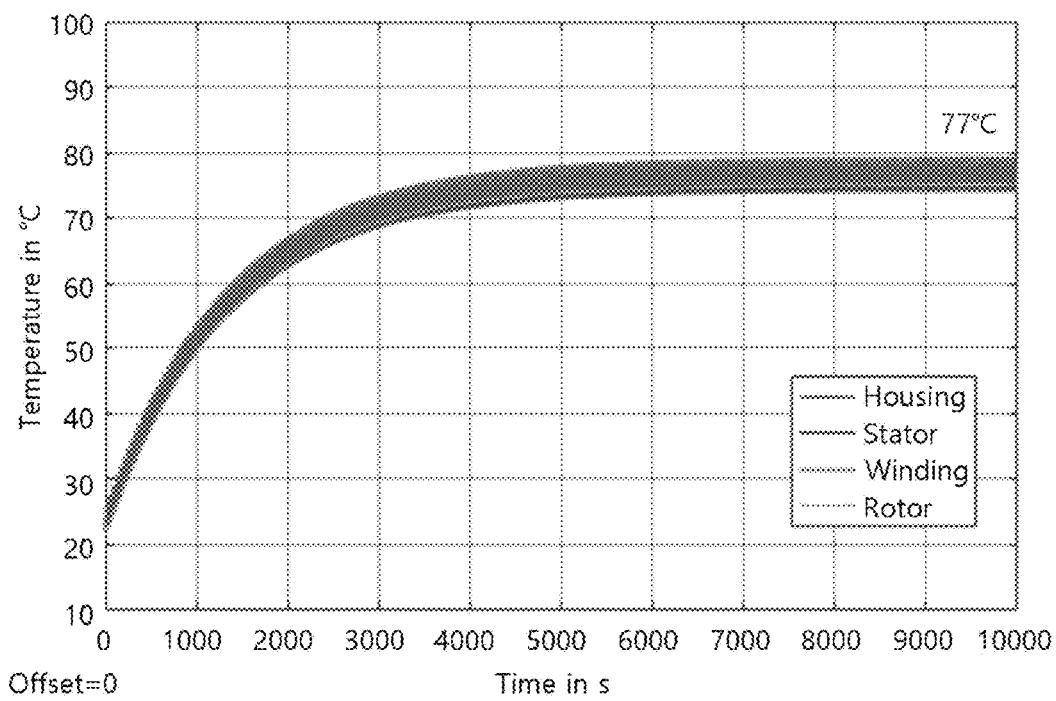
FIG. 9 is a graph showing an analysis result of thermal behavior when an aluminum (Al) coil is applied according to the present disclosure.

FIG. 8 is a graph showing an analysis result of thermal behavior in a motor driven power steering (MDPS) endurance mode when a Cu coil is applied according to the related art. FIG. 9 is a graph showing an analysis result of thermal behavior in the MDPS endurance mode when the Al coil is applied according to the present disclosure.

As can be seen from the results, the Cu coil was saturated at a temperature of 95° C. after 500 cycles and the Al casting coil was saturated at a temperature of 77° C. after 500 cycles.

Figure 10:
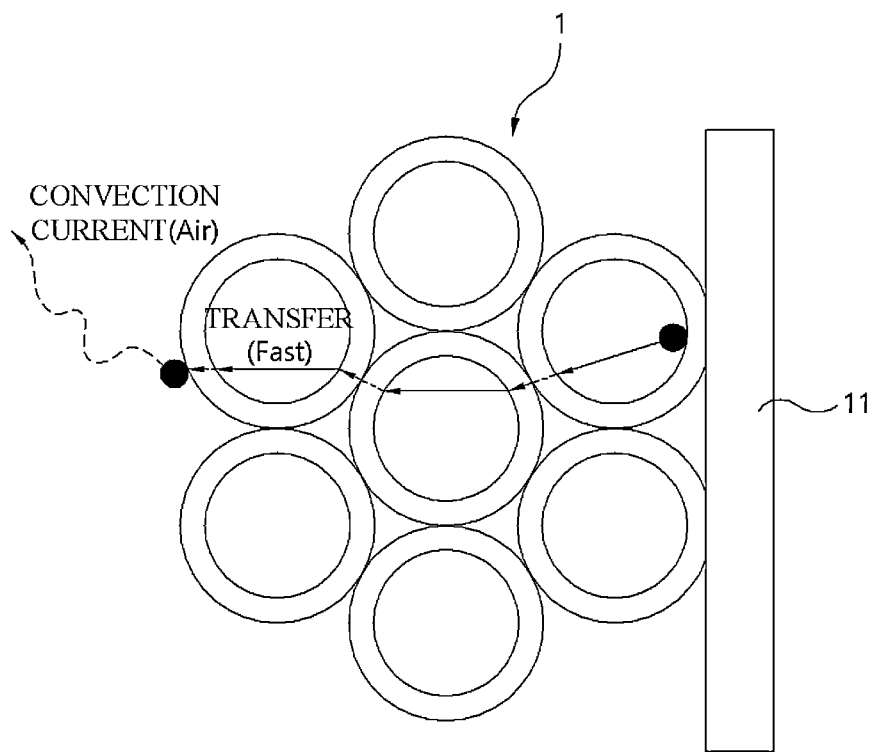
FIG. 10 is a diagram illustrating a heat transfer method when the Cu coil is applied according to the related art.
Figure 11:
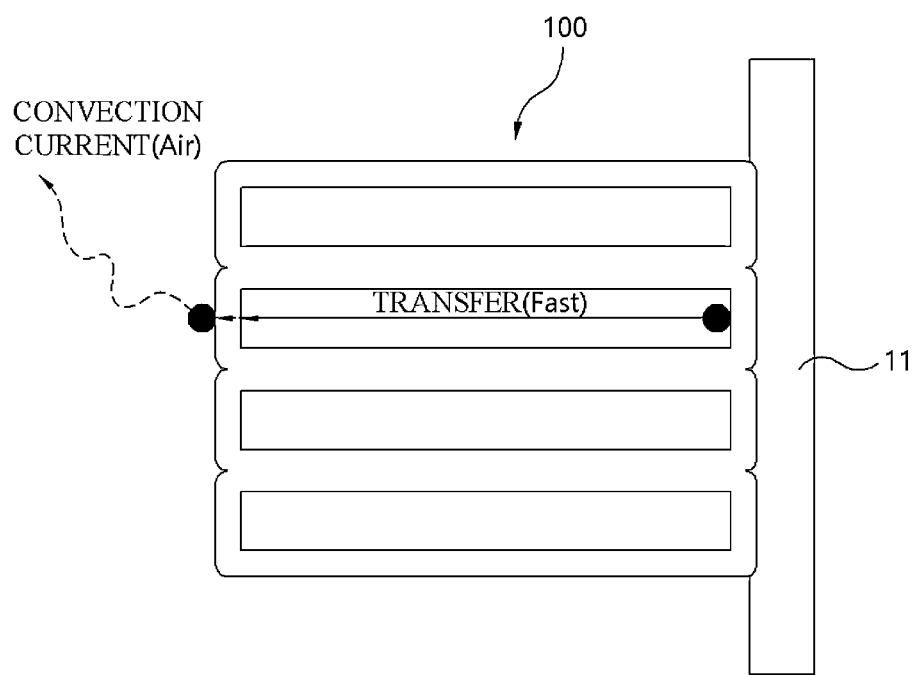
FIG. 11 is a diagram illustrating a heat transfer method when the Al coil is applied according to the present disclosure.

From a heat transfer method of FIG. 10 when the Cu coil was applied and a heat transfer method of FIG. 11 when the Al coil was applied, it can be seen that the reason for a difference in saturation temperature between the two cases is that the casting coil had a metal conductive surface area that was larger than a metal conductive surface area of the Cu coil.

Figure 12:
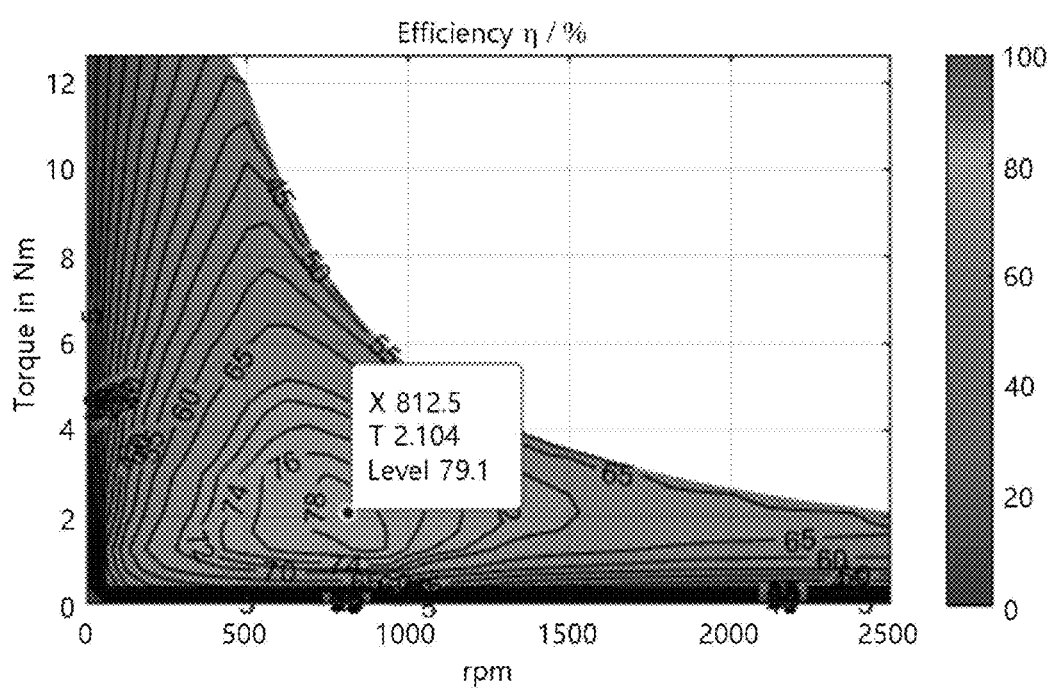
FIG. 12 is a graph showing an evaluation result of motor efficiency when the Cu coil is applied according to the related art.
Figure 13:
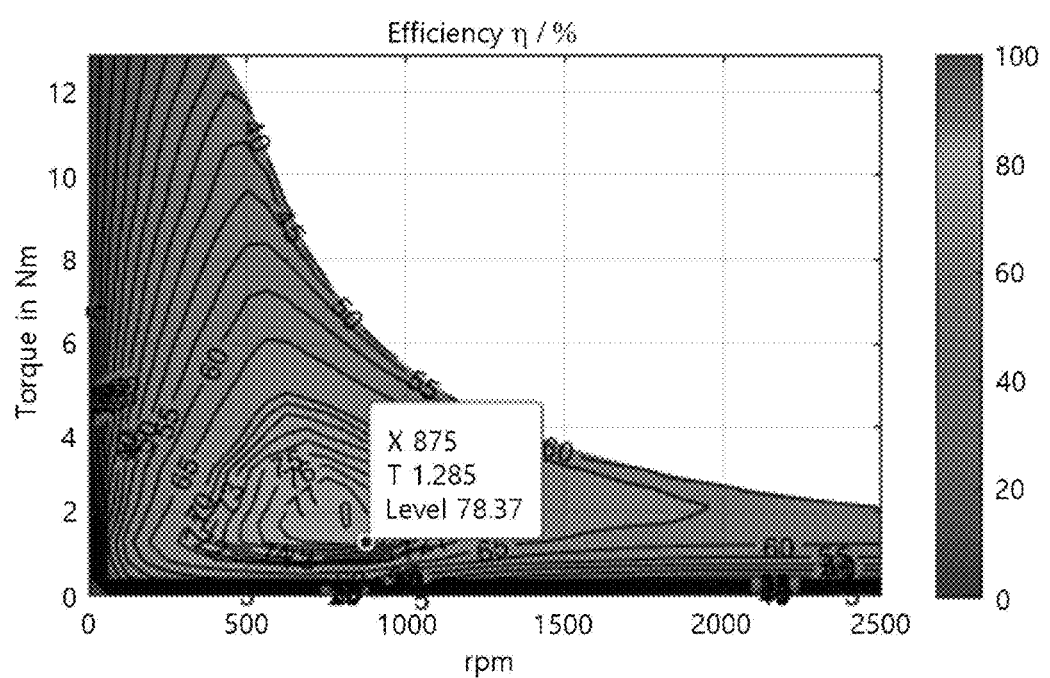
FIG. 13 is a diagram illustrating an evaluation result of motor efficiency when the Al coil is applied according to the present disclosure.

FIG. 12 is a graph showing an evaluation result of motor efficiency in an ES endurance condition when the Cu coil is applied according to the related art. FIG. 13 is a graph showing an evaluation result of motor efficiency in an ES endurance condition when the Al coil is applied according to the present disclosure.

In a thermal saturation endurance mode at 100,000 cycles, a temperature of the Cu coil was 95° C. and a temperature of the Al casting coil was 77° C. An optimal point of the Cu coil was efficiency of 79.31% (at 812.5 rpm) and an optimal point of the Al casting coil was efficiency of 78.4% (at 875 rpm).

From the above description, it can be seen that the efficiency when the Al casting coil was applied was equivalent to the efficiency when the Cu coil was applied. Also, when the Al casting coil is applied, the weight may be reduced by 51.5% and the production cost may also be reduced by 86.7% when compared with the Cu winding coil.

In accordance with a casting coil of the present disclosure, a slot filling factor of a stator, which is an area occupied by a coil per slot area, can be significantly improved up to 78%. Thus, performance of a motor can be further improved.

In addition to the above description, interference between slots can be eliminated.

Since the casting coil of the present disclosure is mounted by a press-fitting process instead of a winding process, the existing winding process can be eliminated. Thus, weight and production cost can be reduced.

Therefore, the casting coil can be applied to not only general motors such as motor driven power steering (MDPS) motors and blow motors, but also eco-friendly vehicle driving motors and in-wheel motors.

While the present disclosure has been described with reference to the accompanying drawings, it should be apparent to those having ordinary skill in the art that various changes and modifications can be made without departing from the spirit and scope of the present disclosure without being limited to the embodiments disclosed herein. Accordingly, it should be noted that such alternations or modifications fall within the claims of the present disclosure, and the scope of the present disclosure should be construed on the basis of the appended claims.

What is claimed is:

1. A casting coil for a motor assembly, the casting coil comprising:
   a first coil formed to extend in one direction;
   a second coil bent to extend from an end of the first coil;
   a third coil bent to extend from an end of the second coil in a direction parallel to the first coil; and
   a fourth coil bent to extend from an end of the third coil in a direction parallel to the second coil,
   wherein the first coil, the second coil, the third coil, and the fourth coil form one layer so that an integral structure in which an end of the fourth coil is connected to a first coil of a next layer is formed by casting,
   wherein the first coil, the second coil, the third coil, and the fourth coil of the one layer are formed to be spaced a predetermined distance from the first coil, the second coil, the third coil, and the fourth coil of the next layer by casting,
   wherein the one layer is integrally in surface contact with the next layer to be stacked by pressing so that the multi-layer structure is formed, and
   wherein a width of each of the first coil, the second coil, the third coil, and the fourth coil is divided into a plurality of pieces.

2. The casting coil of claim 1, wherein an outer side of each of the first coil, a second coil, a third coil, and a fourth coil of the next layer is formed to be smaller than an outer side of each of the first coil, the second coil, the third coil, and the fourth coil of the one layer.

3. The casting coil of claim 1, wherein a bent angle of each of the second coil, the third coil, and the fourth coil is 90 degrees.

4. The casting coil of claim 1, wherein:
the first coil of the next layer is in surface contact with the first coil to be stacked on the first coil;
the second coil of the next layer is in surface contact with the second coil to be stacked on the second coil;
the third coil of the next layer is in surface contact with the third coil to be stacked on the third coil; and
the fourth coil of the next layer is in surface contact with the fourth coil to be stacked on the fourth coil so that the multi-layer structure is formed.

\* \* \* \* \*